United States Patent [19]
Oda et al.

[11] Patent Number: 5,608,829
[45] Date of Patent: Mar. 4, 1997

[54] OPTICAL CONNECTOR HAVING OPTICAL FIBER PROTECTION MEMBER

[75] Inventors: Kenzo Oda, Hadano; Hiroyuki Shoji, Sagamihara, both of Japan

[73] Assignee: The Whitaker Corporation, Wilmington, Del.

[21] Appl. No.: 596,904

[22] Filed: Mar. 11, 1996

[30] Foreign Application Priority Data

Mar. 10, 1995 [JP] Japan ................................. 7-51231

[51] Int. Cl.⁶ .................................................... G02B 6/36
[52] U.S. Cl. ................................ 385/76; 385/92; 385/139
[58] Field of Search ................................ 385/76, 77, 78, 385/92, 139, 93

[56] References Cited

U.S. PATENT DOCUMENTS 5,419,717  5/1995  Abendschein et al. ............... 385/76 X
5,524,160  6/1996  Debeaux et al. ..................... 385/93 X

*Primary Examiner*—Rodney B. Bovernick
*Assistant Examiner*—Phan T. H. Palmer

[57] ABSTRACT

The optical connector of this invention consists of a plug housing 20 having a joining cavity 22 with bosses 22a and 22b formed on the inside walls 20a, an optical fiber protection member 40 having a plate-shaped base 42 which can be inserted in and pulled out from the joining cavity 22, and a header housing 60 having a joining protrusion 62 fitting in the joining cavity 22. When the plug housing 20 and the header housing 60 are not connected, the front end of the optical fiber 24 is located in the through opening 42a of the optical fiber protection member 40, thus protecting the optical fiber 24 from damage. Upon mating of the header housing 60 with the plug housing 20, the optical fiber protection member 40 is urged back into the plug housing 20 to expose the optical fiber 24.

6 Claims, 5 Drawing Sheets

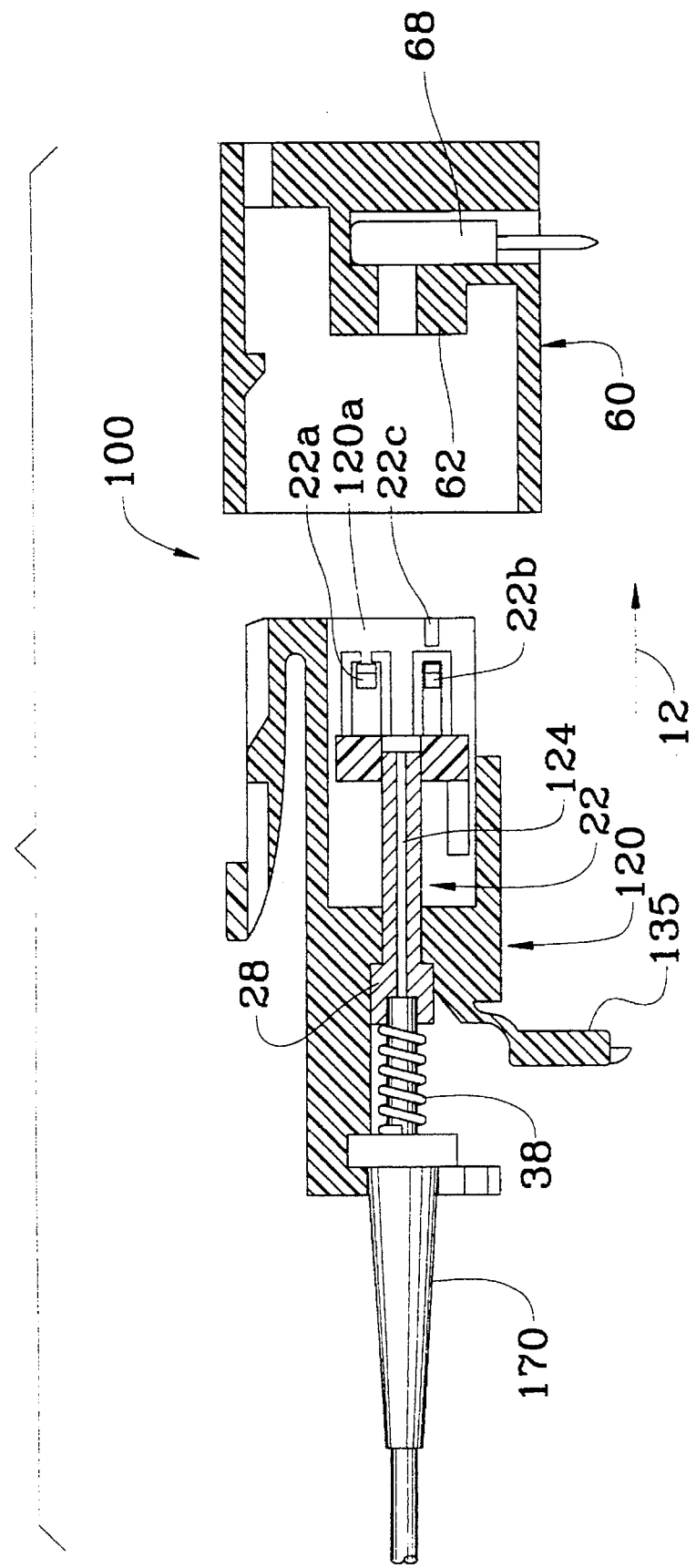

5,608,829

OPTICAL CONNECTOR HAVING OPTICAL FIBER PROTECTION MEMBER

FIELD OF THE INVENTION

This invention relates to optical connectors used for the connection of optical fibers to optical elements.

BACKGROUND OF THE INVENTION

Optical connectors are usually used for the connection of optical fibers to optical elements. These optical connectors consist of a first housing retaining an optical fiber and a second housing retaining an optical element. The optical fiber is usually retained by means of a ferrule surrounding the optical fiber, and the optical fiber surrounded by the ferrule is secured in the first housing by means of a so-called harness. Sometimes, the front end of the optical fiber can be damaged in the process of the handling of this harness which results in deterioration of the transmission characteristics and in an inaccurate transmission of the optical signals.

A method intended to prevent the front end of the optical fiber surrounded by a ferrule from damage is shown in Japanese Utility Model Disclosure Sho 63 (1988)-128511. According to this method, the ferrule is secured in the housing in such a manner that the front end of the optical fiber is recessed from the front end of the housing, and the connection of the front end of the optical fiber and the optical element is accomplished by means of a short optical fiber or other optical transmission medium. While this method makes it possible to prevent the front end of the optical fiber form damage during the handling of the harness, it produces additional surfaces of connection between the short optical fiber and the optical fiber secured by the harness and between the short optical fiber and the optical element, which results in an increase in the alternation of the optical signals transmitted through the connector.

Another method of solving this problem consists of providing a spring biased protective member enclosing the front end of the optical fiber and biased forward, farther than the front end of the optical fiber. When the optical fiber is mated to the optical element, the protective member is pushed back as shown in Japanese Patent Disclosure Hei 1(1989)-316711. In this method, the biasing spring is made rather strong so that it would be impossible to push the protective member back by a tool or some other item. However, such a design requires a high mating force to push the spring biased protective member back in order to expose the optical fiber ends. Another disadvantage of this method is that it requires additional parts.

The object of this invention is to offer an optical connector having relatively few parts and providing protection for the front end of the optical fiber.

SUMMARY OF THE INVENTION

The object of this invention was achieved by providing an optical connector having a first housing, an optical fiber protection member, and a second housing, the first housing having a joining cavity with bosses formed on the inside walls extending in a mating direction which is intended for the retention of an optical fiber inserted in this joining section in the direction of connection and secured in this inserted position. The optical fiber protection member having a base with a through opening through which an optical fiber is inserted, having at least one leg extending from the base in the mating direction and latching with the above-mentioned bosses, which can be inserted in and withdrawn from the joining section. The second housing having a joining protrusion fitting into the joining cavity equipped with thrust protrusions formed on the outside wall, which retains an optical element to which an optical fiber is connected.

When the first and second housings are not mated, the optical fiber protection member is located in the first housing such that the front end of the optical fiber is inside the through opening because the legs and the bosses are engaged.

When the first and second housings are mated, the legs and bosses are released from each other due to the fact that when the joining protrusion is inserted in the joining cavity, the thrust protrusions bend the legs. When the first and the second housings of the optical connector according to this invention are not connected, the front end of the optical fiber is protected due to the fact that the front end of the optical fiber is located inside the through opening of the protection member which is retained inside the first housing because the legs of the optical fiber protection member are engaged with the bosses of the first housing. Since the bosses of the first housing are made on the inside wall of the joining cavity, it is impossible to disengage the legs from the bosses even using tools. And when the first and the second housings are connected and the matching protrusion is inserted in the joining cavity, the thrust protrusions bend legs, thus releasing the engagement of the legs and the bosses which makes it possible to connect the optical fiber to the optical element. In this manner, the optical connector according to this invention makes it possible to protect the front end of the optical fiber by using the optical fiber protection member, while keeping the number of parts in the connector relatively small.

BRIEF DESCRIPTION OF THE DRAWINGS

In FIG. 3, the first and the second housings at the very beginning of mating; in FIG. 4, the first and the second housings are shown in an advanced position of mating; FIG. 5 shows the first and the second housings in the fully mated position.

FIG. 7 shows a cross sectional view of the optical connector shown in the FIG. 5 in the assembled

DETAILED DESCRIPTION OF THE INVENTION

Embodiments of this invention will now be described by way of example with reference to the accompanying drawings.

Figure 1:
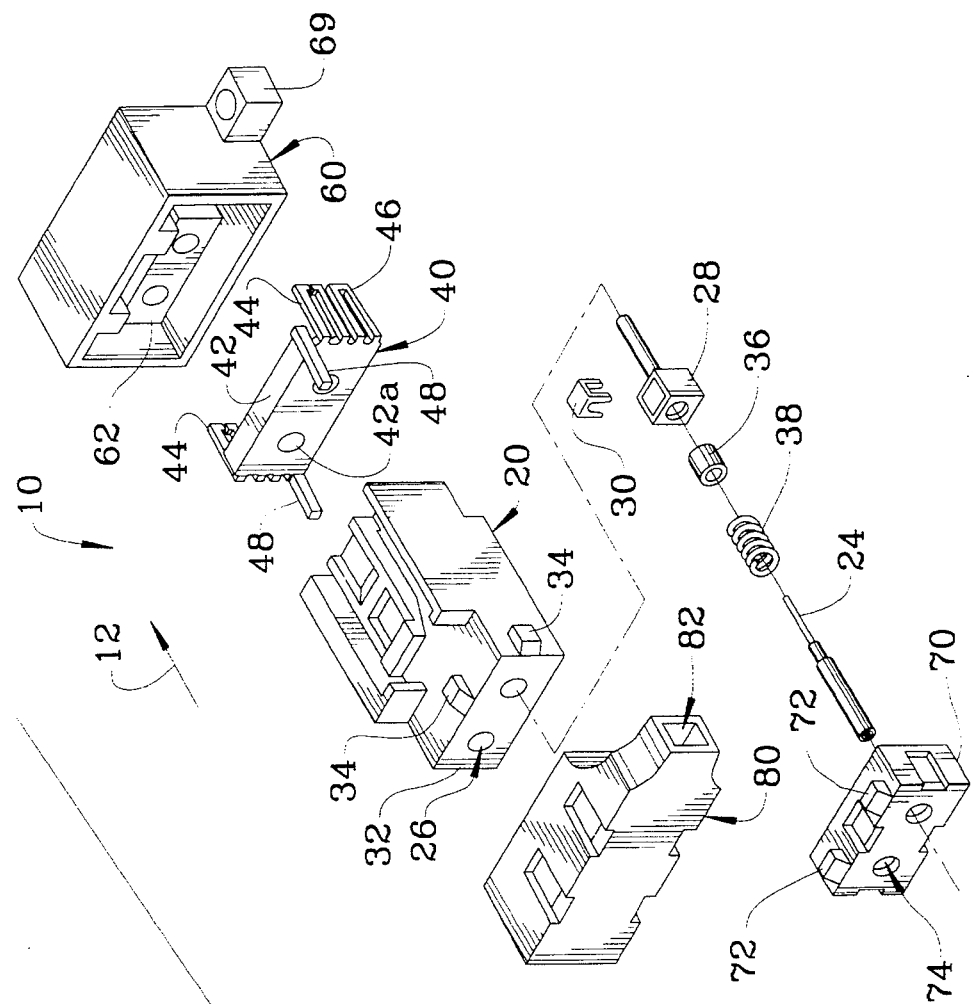
FIG. 1 shows an exploded three-dimensional view of the optical connector according to the first embodiment of this invention.
Figure 2:
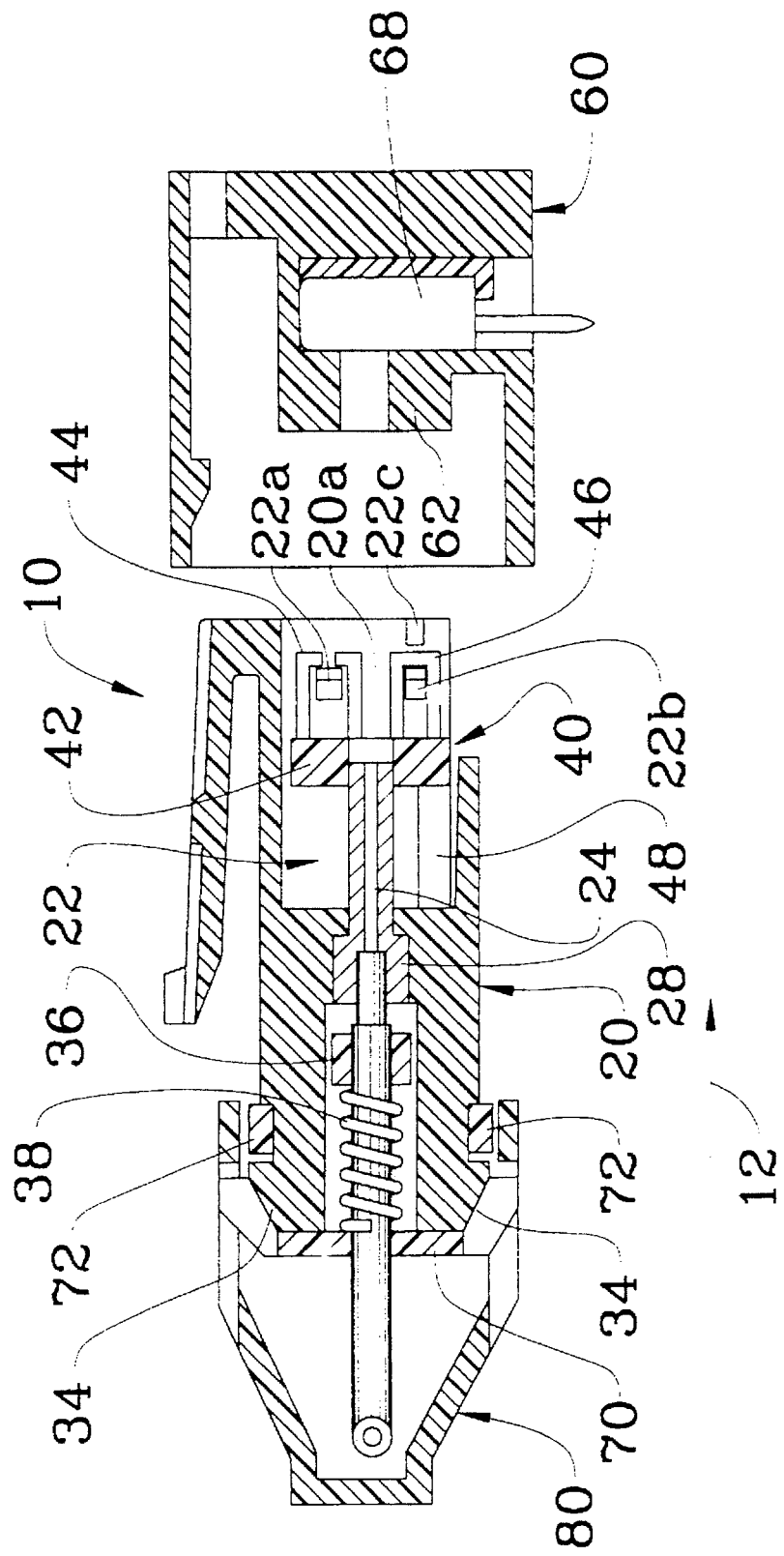
FIG. 2 shows a cross sectional view of the optical connector shown in the FIG. 1 in the assembled state.

FIG. 1 shows an exploded oblique view of the first embodiment of the optical connector according to this invention; FIG. 2 shows a cross sectional view of the optical connector shown in FIG. 1 in the assembled state.

The optical connector 10 consists of a first housing or plug housing 20 having a joining cavity 22 with bosses 22a and 22b formed on the inside walls 20a and extending in the mating direction indicated by the arrow 12; an optical fiber protection member 40 which can be inserted in and withdrawn from the joining cavity 22 having a plate-shaped base 42; and a second housing, or header housing 60 having a joining protrusion 62 which fits in the joining cavity 22.

Inside the joining cavity 22 of the plug housing 20, a through opening 26 is provided through which the optical fiber 24 is inserted and retained. A ferrule 28 is secured on the front end of the optical fiber 24 and fixed by a retainer 30. This provides for the protection of the front end of the optical fiber 24. At the rear wall 32 of the plug housing 20, a holder 70 is attached by means of latching projections 34 and secured by a cover 80 which is attached by means of cover latching projections 72. Slightly to the rear of the front end of the optical fiber 24, a ring 36 is crimped around the reinforcing sleeve of the optical fiber 24. The section between this ring 36 and the holder 70 has a spring 38. This spring 38 biases the optical fiber in the mating direction. In the holder 70 and cover 80, through holes 74 and 82 are provided for the optical fiber 24.

The base 42 of the optical fiber protection member 40 has a through opening 42a for the optical fiber 24. The optical fiber protection member 40 has a pair of L-shaped legs 44 and U-shaped legs 46 extending from the right and left sides of the base 42 in the mating direction. As it will be explained below, L-shaped legs 44 are intended to engage with bosses 22a, and U-shaped legs 46 with bosses 22b. In addition, the optical fiber protection member 40 has two guiding rods 48 extending from the base 42 opposite the direction. The function of these guiding rods 48 is to prevent the optical fiber protection member 40 from skewing.

The joining protrusion 62 of the header housing 60 has thrust protrusions 66 (see FIG. 3) formed on the outside walls 64. The optical element 68 intended for the connection with the optical fiber 24 is housed in the header housing 60. The header housing 60 also has mounting sections 69 intended for the fixing the connector to a board (not shown in the drawing).

Referring now to FIGS. 2–5, the process of mating the plug housing 20 and the header housing 60 will be described in greater detail.

FIG. 2 depicts a state when the plug housing 20 and the header housing 60 are completely disengaged from each other. In this position, the optical fiber protection member 40 is retained in the plug housing 20 with the front end of the optical fiber 24 (see FIG. 1) being located inside the through opening 42a due to the fact that the L-shaped legs 44 are engaged with the bosses 22a. The movement of the optical fiber protection member 40 in the mating direction is prevented by the fact that the U-shaped legs 46 are engaged with the bosses 22c formed on the inside wall 20a. Due to such an arrangement, the front end of the optical fiber is reliably protected prior to the connection of the plug housing 20 and the header housing 60.

Figure 3:
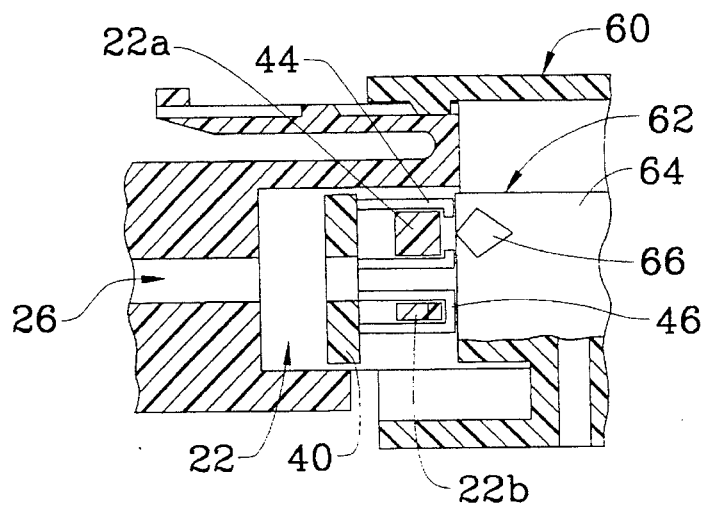
FIGS. 3–5 shows cross sectional views of the first and the second housings in the process of connection.
Figure 4:
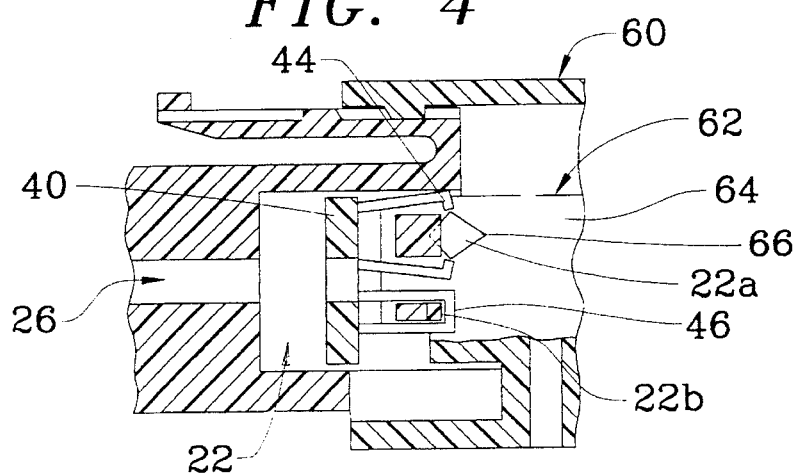
Figure 5:
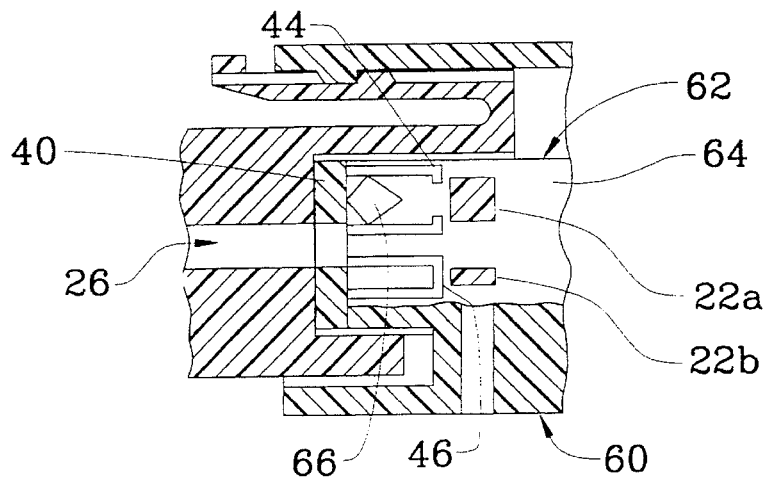

FIG. 3 depicts a position when the plug housing 20 and the header housing 60 just start to be mated. The front edge of the thrust protrusions 66 is wedged between the ends of the L-shaped legs 44. When the connection of the plug housing 20 and the header housing 60 is advanced slightly farther (as shown in FIG. 5), the joining protrusion 62 enters the joining cavity 22, and the thrust protrusions 66 penetrate between the L-shaped legs 44, thus releasing the engagement of the L-shaped legs 44 and the bosses 22a. Due to the engagement of the U-shaped legs 46 and the bosses 22b, the optical fiber protection member 40 is temporarily stopped. This allows to avoid the movement of the optical fiber protection member 40 alone in an event of a shock during the connection. When the connection progresses even farther (to a position shown in FIG. 5), the optical fiber protection member 40 is pushed inside by the joining protrusion 62. The connection is completed when the engagement of the U-shaped legs 46 and the bosses 22b is released. At this time, the optical fiber 24 comes in contact with the optical element 68, and they become optically connected. When the header housing 60 is removed from the plug housing 20, the back edge of the thrust protrusion 66 engages with the L-shaped legs 44, and after the optical fiber protection member 40 is returned to its original position (FIG. 3), the protrusion separates the L-shaped legs 44, and comes out of the engagement. Therefore, it is possible to return the optical fiber protection member 40 to its original position without a separate spring. The thrust protrusion 66 shown in FIGS. 3–5, by solid lines is extended above the plane of the paper, another thrust protrusion 66 is formed on the opposite side of the joining protrusion.

Figure 6:
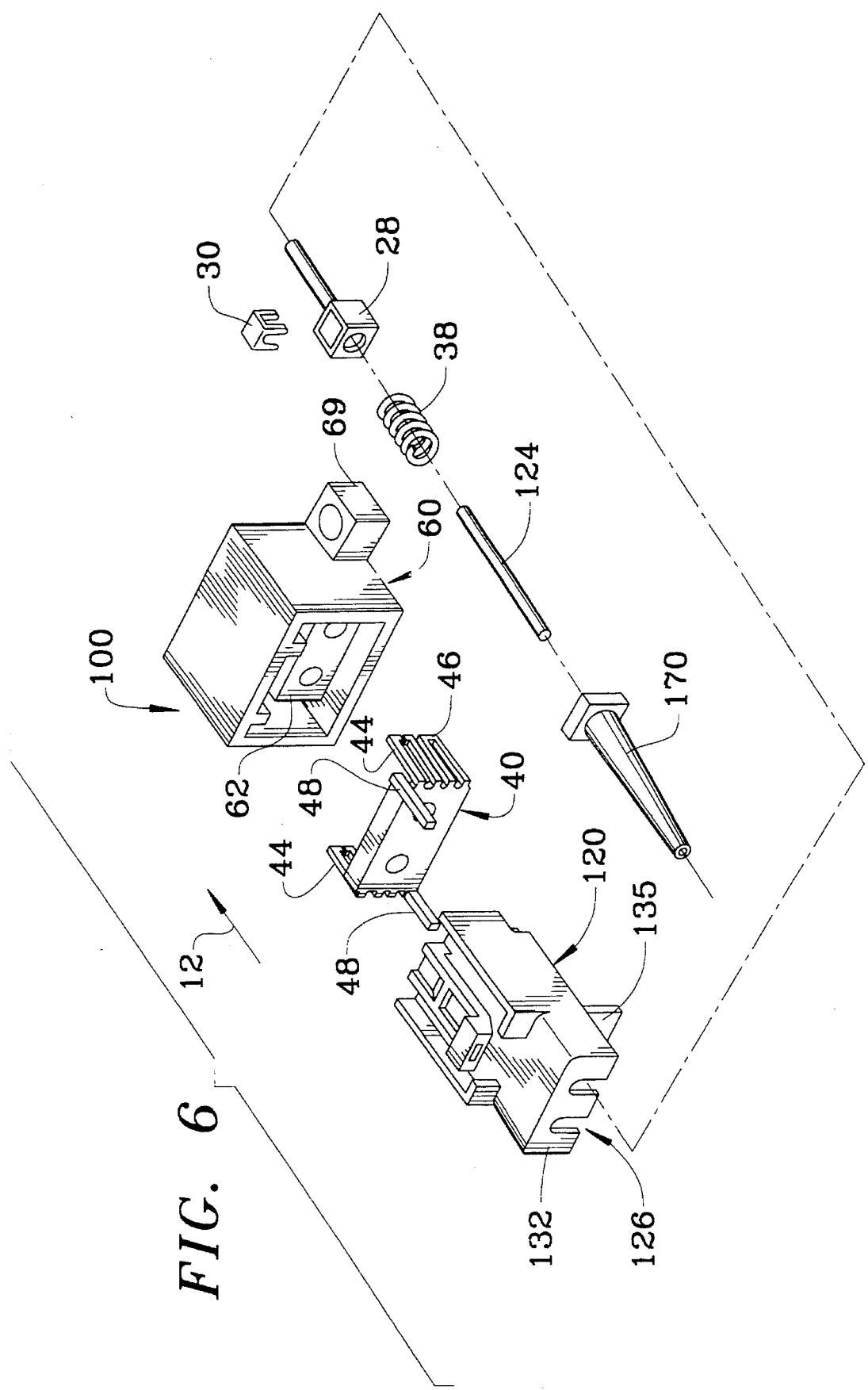
FIG. 6 shows an exploded three-dimensional view of the optical connector according to the second embodiment of this invention.

FIG. 6 is an exploded three-dimensional view of the second embodiment of the optical connector according to this invention; FIG. 7 is a cross sectional view of the optical connector shown in FIG. 6 in the assembled state.

The optical connector according to the second embodiment of this invention has even fewer parts. Components which are common to the optical connector 10 shown in FIG. 1 are designated the same numbers. The optical fiber protection member 40 and the header housing 60 are the same as in FIG. 1. The process of connection of the plug housing 120 and the header housing 60 is the same as shown in FIGS. 2–5.

The optical connector 100 consists of a plug housing 120 having a joining cavity 22 with bosses 22a and 22b formed on the inside walls 120a and extending in the mating direction indicated by the arrow 12, an optical fiber protection member 40, and a header housing 60.

The optical fiber 124 is retained inside the joining cavity 22 of the plug housing 120 so that it extends in the mating direction. The front end of the optical fiber 124 is mounted in the ferrule 28 and is secured in the retainer 30 protecting the front end of the optical fiber 124. In the rear wall 132 of the plug housing 120, slots are provided for the holder 170 which prevents the spring 38 from falling off. Flap 135 is provided to maintain the holder 170 in place in the plug housing 120 during the use of the connector 100. This configuration of the optical connector 100 makes it possible to reduce the number of parts even more compared to the optical connector 10 as compared to the first embodiment of this invention. As follows from the above explanations, the optical connectors 10, 100 according to this invention makes it possible to prevent the front end of the optical fiber, 24, 124 from damage by placing it through a through opening 42a of the optical fiber protection member 40, that is, it makes it possible to protect the front end of the optical fiber 24, 124 while having fewer parts.

We claim:

1. An optical connector comprising:

A first housing having a joining cavity with bosses formed on its inside walls extending in a mating direction, an optical fiber protection member having a base with a through opening through which an optical fiber is inserted, at least one leg extending from the base in the mating direction and being latchable with the bosses of the first housing, a second housing having a joining protrusion fitting into the joining cavity of the first housing, and thrust protrusions formed on an outside wall;

whereby in an unmated position, the optical fiber protection member is located in the first housing so that the front end of the optical fiber is inside said through opening because the legs and the bosses are engaged, and in a mated position, the legs and the bosses are released from each other due to the fact that when the joining protrusion is inserted in the joining cavity, the thrust protrusions spread the legs.

2. The optical connector as recited in claim 1 wherein the at least one leg is L-shaped having a long portion and a short portion, the leg engages the bosses along the short portion.

3. The first housing as recited in claim 1 wherein the bosses are rectangular in shape.

4. The second housing as recited in claim 1 wherein the thrust protrusions have a plurality of corners.

5. The second housing of claim 4 wherein the thrust protrusions are positioned such that two of the corners of each protrusion lie on an axis extending along the mating direction.

6. A first housing of an optical connector, containing an optical fiber for mating with a second housing retaining an optical element, characterized by the fact that it has a joining cavity with bosses formed on the inside walls extending in a mating direction, and that it retains an optical fiber inserted in said joining section along the mating direction and secures said fiber in an inserted position;

it is furnished with an optical fiber protection member consisting of a base with a through opening through which said optical fiber is inserted, having at least one leg extending from the base in the mating direction and latching with said bosses of the first housing, said optical fiber protection member being movable between an inserted position and a withdrawn position due to the interaction of the bosses with the legs during mating and unmating of the first and second housings.

\* \* \* \* \*